US009194966B2

(12) United States Patent
Taleyarkhan

(10) Patent No.: US 9,194,966 B2
(45) Date of Patent: Nov. 24, 2015

(54) PARTICLE DETECTION SYSTEM

(75) Inventor: Rusi Taleyarkhan, Lafayette, IN (US)

(73) Assignee: Sagamore/Adams Laboratories LLC, Chicago, IL (US)

( * ) Notice: Subject to any disclaimer, the term of this patent is extended or adjusted under 35 U.S.C. 154(b) by 628 days.

(21) Appl. No.: 12/462,487

(22) Filed: Aug. 4, 2009

(65) Prior Publication Data

US 2009/0296871 A1  Dec. 3, 2009

Related U.S. Application Data

(63) Continuation-in-part of application No. 11/337,416, filed on Jan. 23, 2006, now abandoned.

(60) Provisional application No. 60/646,022, filed on Jan. 21, 2005.

(51) Int. Cl.
*G01T 3/00* (2006.01)
*G01V 5/00* (2006.01)
*G01T 1/167* (2006.01)

(52) U.S. Cl.
CPC . *G01T 3/00* (2013.01); *G01T 1/167* (2013.01); *G01T 3/008* (2013.01); *G01V 5/0008* (2013.01); *G01V 5/0091* (2013.01)

(58) Field of Classification Search
CPC ..... G01T 3/008; G01V 5/0091; G01V 5/0008
USPC ............... 376/153, 154, 155; 250/264, 269.1, 250/269.4, 269.5, 269.6, 390.01, 392
See application file for complete search history.

(56) References Cited

U.S. PATENT DOCUMENTS

| | | | | | |
|---|---|---|---|---|---|
| 3,016,961 | A | * | 1/1962 | McKay et al. | 175/41 |
| 3,609,353 | A | * | 9/1971 | Paine et al. | 250/399 |
| 3,991,313 | A | * | 11/1976 | Leschek | 250/390.01 |
| 4,043,755 | A | * | 8/1977 | Bartko et al. | 376/159 |
| 4,143,274 | A | * | 3/1979 | Apfel | 250/473.1 |
| 4,333,796 | A | * | 6/1982 | Flynn | 376/102 |
| 5,264,702 | A | * | 11/1993 | Mihalczo | 250/390.11 |
| 5,399,863 | A | * | 3/1995 | Carron et al. | 250/370.05 |
| 6,134,289 | A | * | 10/2000 | Peurrung et al. | 376/153 |
| 7,448,790 | B2 | * | 11/2008 | Tessien et al. | 366/114 |
| 7,700,041 | B2 | * | 4/2010 | Farmer et al. | 422/504 |
| 2003/0074010 | A1 | * | 4/2003 | Taleyarkhan | 606/128 |
| 2004/0253183 | A1 | * | 12/2004 | Uber et al. | 424/9.52 |

OTHER PUBLICATIONS

Cross section (in barns) versus incident energy (in MeV) from Multi-platform EXFOR-CINDA-ENDF, V. Zerkin, IAEA-NDS (1999-2011).*

(Continued)

*Primary Examiner* — Jack W Keith
*Assistant Examiner* — Daniel Wasil
(74) *Attorney, Agent, or Firm* — Robert M. Gould; Hahn Loeser & Parks LLP

(57) ABSTRACT

A system to detect ionizing particles includes an enclosure which holds a fluid in a tensioned metastable state. The interaction of a particle with the liquid creates a respective vapor pocket that can be seen and recorded, and also results in a shock wave that can be heard and recorded. The level of tension metastability in combination with agents, such as Be and B atoms, and surfactants that minimize evaporation losses is associated with a particular type of particle.

13 Claims, 11 Drawing Sheets

(56) References Cited

OTHER PUBLICATIONS

Hahn et al, "The <<Spinner>>. A New Detector for Rare Nuclear Processes", II Nuovo Cimento, vol. 54, No. 1, pp. 101-106 (Mar. 11, 1968).*
WO 02/097823 A1, Taleyarkhan et al, Dec. 5, 2002.*
WO 01/39200 A2, Tessien, May 31, 2001.*
Greenspan et al, "Radiation-Induced Acoustic Cavitation; Apparatus and Some Results", Journal of Research of the National Bureau of Standards, Engineering and Instrumentation, vol. 71C, No. 4, Oct. 1967.*
Briggs, "Limiting Negative Pressure of Water", Journal of Applied Physics, vol. 21, Jul. 1950.*
Taleyarkhan et al, "Evidence for Nuclear Emissions During Acoustic Cavitation", Science, vol. 295, Mar. 8, 2002.*
Seitz, On the Theory of the Bubble Chamber, The Physics of Fluids, vol. 1, No. 1, Jan.-Feb. 1958, pp. 2-13.
Fisher, The Fracture of Liquids, Journal of Applied Physics, vol. 19, Nov. 1948 pp. 1062-1067.

* cited by examiner

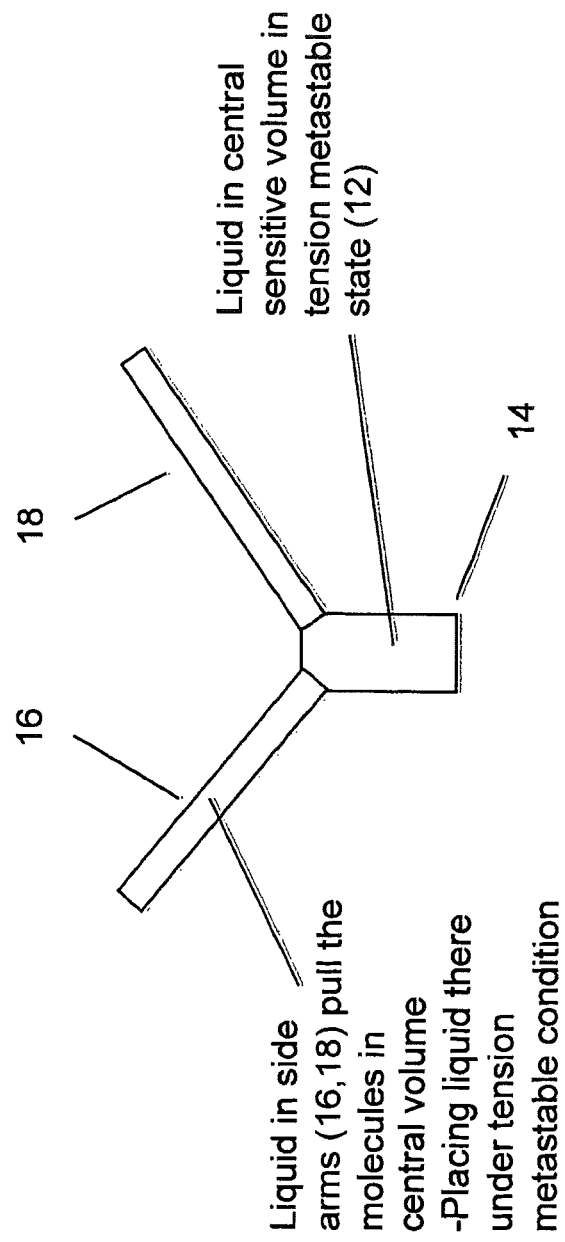

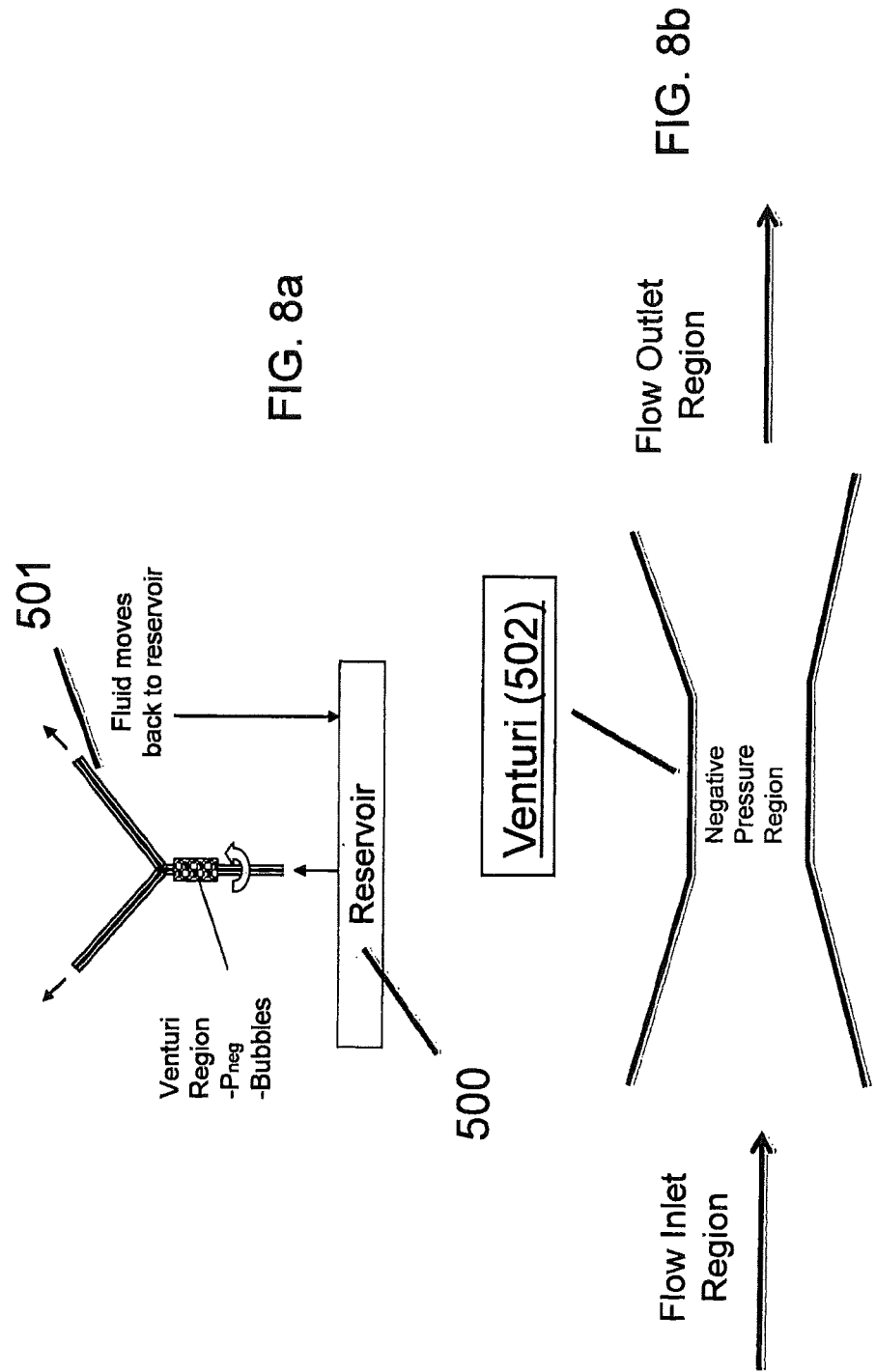

PARTICLE DETECTION SYSTEM

This application claims the benefit of U.S. Provisional Application No. 60/646,022, filed Jan. 21, 2005, and U.S. Non Provisional application Ser. No. 11/337,416 the entire contents of which are expressly hereby incorporated herein by reference. This application is a Continuation in Part of U.S. Non Provisional application Ser. No. 11/337,416.

BACKGROUND

The detection of neutrons, gamma rays and alpha particles is of great importance in the global war against weapons of mass destruction and terrorism, and in the fields of physics and engineering. Conventionally, gamma ray and alpha particle detection is performed using HPGe/NaI scintillation systems or by use of other systems that cause gas ionization to take place under high voltages, as in a Geiger-Muller (G-M) tube. The detection of neutrons is more difficult, especially in a high gamma ray background and is usually performed in liquid-scintillation (LS), He-3 or $BF_3$ type detectors in combination with accompanying components which permit discrimination of neutrons from gamma fields. Such systems, however, are expensive and require good knowledge of nuclear physics/instrumentation, and are usually non-portable.

Specifically, conventional detectors for nuclear particle detection (especially ones that can also detect and discriminate neutrons) depend on the use of systems such as plastic scintillators, liquid scintillators to fission chambers, G-M type counters and superheated droplet detectors (SDDs). These devices (with the exception of the SDDs) require extensive electronics in the form of high-voltage power supplies, photomultiplier tubes, preamplifiers, associated pulse shape discrimination and counting logic systems. These systems rely on nuclear interactions that result in ionization, light production and amplification, etc. Note that these conventional systems are not implemented as a comprehensive hand-portable system that can distinguish neutrons from alpha particles and gamma ray sources with the benefits of low-cost, high efficiency and simplicity of operation. Also, once the SDD droplets are vaporized the droplets need to be visually inspected (or counted in a special counter) and the system needs to be taken off service and refilled or reset overnight since it is not regenerative.

SUMMARY

In general, various implementations of the present invention provide a simple-to-use novel and unique, low cost system for detection of neutrons and gamma rays from special nuclear materials based on the physics of interaction of nuclear particles with fluids in a tensioned metastable state. An optimized system for field use is provided that represents a departure from present-day approaches in terms of simplicity of set up, use, improved efficiency, and at costs that are significantly less than that of conventional present-day systems.

In a general aspect of the invention, a system for detecting particles includes an enclosure which generates neutrons upon interaction with alpha particles or gamma photons and which holds a pretreated fluid in combination with an additive to detect thermal energy level neutrons through absorption, and further includes a motor coupled to the enclosure for spinning the enclosure to pretension the fluid into a metastable state. The interaction of the particle with the fluid in the metastable state creates a respective vapor pocket, which creates a shock wave, the of which is associated with a particular type of particle.

In another aspect of the invention, a system for detecting nuclear particles includes an enclosure which holds a pretreated fluid and a generator coupled to the enclosure to induce acoustic pressure oscillations of the desired shape, amplitude and frequency in the fluid to pretension the fluid into a metastable state.

Further features and advantages of this invention will become readily apparent from the following description, and from the claims.

BRIEF DESCRIPTION OF THE DRAWINGS

FIG. 2a is an image of an enclosure of the system of FIG. 1 holding a metastable fluid before the interaction of an ionizing particle with the fluid;

FIG. 8 is a schematic view of the venturi-based continuously operating centrifugal tensioned metastable fluid detector system.

DETAILED DESCRIPTION

Figure 1:
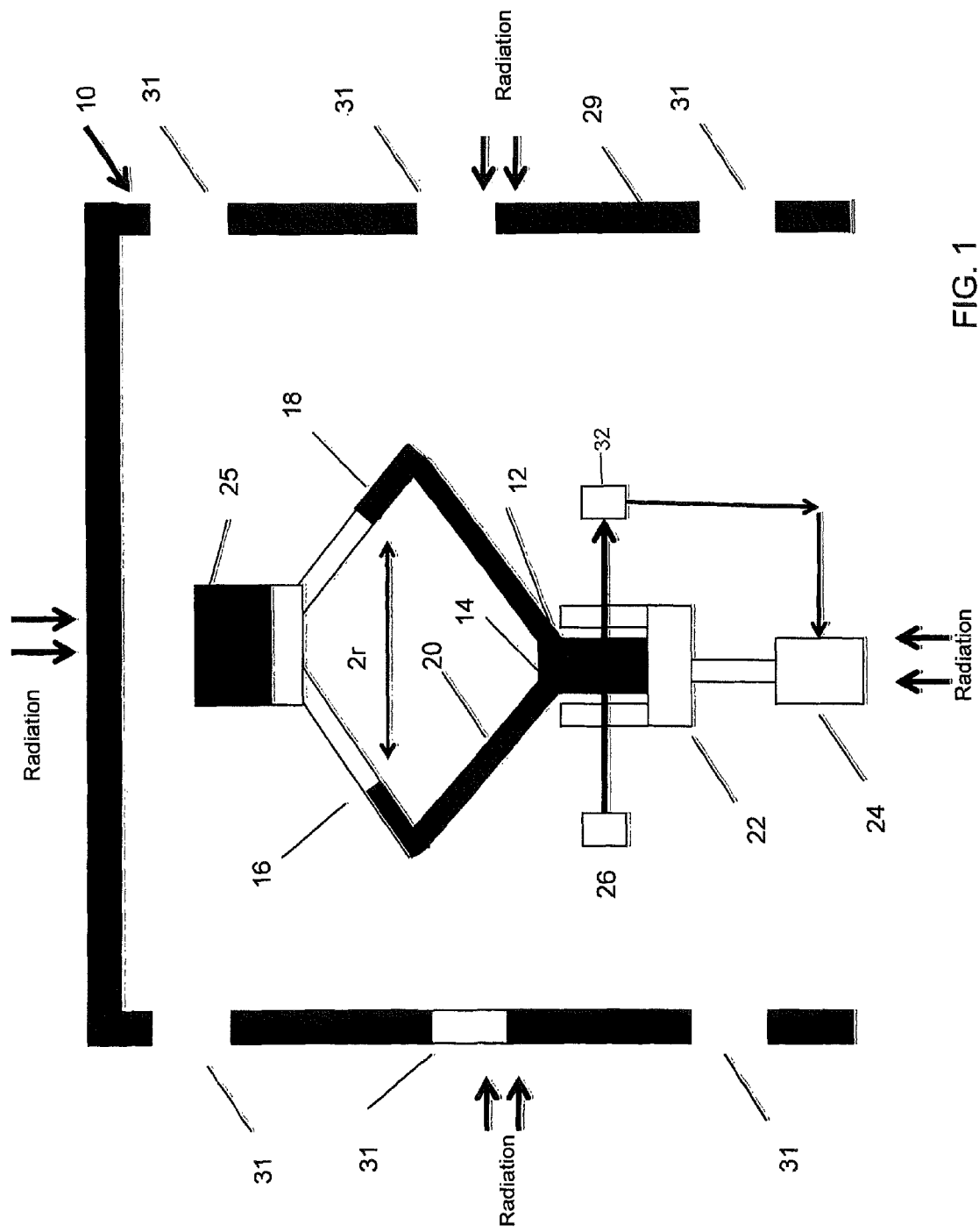
FIG. 1 is a schematic of a system for ionizing particle detection in accordance with an embodiment of the invention.

In accordance with various embodiments of the invention, a tensioned metastable fluid detection (TMFD) system is implemented that reduces costs and advances the state-of-the-art in detection of key particle spectral emanations (viz., neutrons, alphas and gamma rays over a range of energies) from special materials such as U, or Pu or other materials of strategic interest such as those from "dirty" bombs using fission products. The system is based on the nucleation and implosive collapse of critical size cavities on the nano (for example, between about 10 and 100 nm) dimension scale by collision interaction of particles with nuclei of metastable fluids. Two effective means for induction of a tensioned metastable state encompassing virtual superheat are: (1) to cause centrifugal force-based pretensioning, and, (2) acoustically-induced pressure oscillations in selected fluids (such as water, acetone, methanol, trimethyl borate, $C_2Cl_4$, etc.). Calculations show that "individual" neutrons, gamma rays, or alpha particles from spontaneously emitting sources such as even numbered Pu isotopes or Cf-252, U isotopes, and gamma emitters such as Cs or Co induce growth of (10-100 nm) critical size vapor pockets if the fluid is in a suitable metastable state. The resulting shock waves give rise to the characteristic audible "click" of a nuclear particle count. A simple electronic counter, and notebook PC based software then gives an indication of the strength and type of source being interrogated. The threshold metastability for nucleation by these particles varies very strongly with the energy and type of nuclear emission. By appropriately tailoring the degree of metastability of the fluid, the system in FIG. 1 can be implemented as a uniquely simple, hand-held, ultrasonic or centrifuge based nuclear particle detector of size like a "Dremel" tool or ultrasonic toothbrush—one with enough sensitivity to collectively detect and if desired distinguish gamma rays, alpha particles and neutrons from one another. The working fluid used for detection purposes is appropriately pretreated and/or encompasses a surfactant like substance to minimize evaporation at the gas-liquid interfaces and to improve wetting. Proper pretreatment ensures that the system will not give rise to spurious nucleation resulting in false-positives. Also, such pretreatment then permits attainment of the desired levels of tensioned metastability such that the system becomes sensitive to the appropriate nuclear particle (for example, neutrons of a given energy). Pretreatment schemes can involve (most desirably) subjecting the test liquid and enclosure to pre-compression (to pressures in the range of up to several kbars). While doing so the test system (shown schematically if FIG. 7) is located in the fluid of the pressure chamber. In this mode of pretreatment the liquid inside the test enclosure and outside pressurizing fluid are both subject to the same extent of pressurization such that the walls of the enclosure retain their structural integrity. Such a means for pretreatment allows the liquid to "wet" all foreign objects within it creating a glued-like environment such that weak points for spurious nucleation are eliminated. The same holds true for creating a state of goad—enough wetting between the liquid and the walls of the detector cell container—to then prevent spurious nucleation at wall-liquid interfaces. Alternative means of pretreatment involve filtering the test fluid via use of 1 mm filters prior to filling the test detector cell or the removal of dissolved gases in the test liquid. Dissolved gases in the test liquid can be removed via boiling of the test liquid, or via acoustic agitation in the presence of neutron sources. Pretreatment can also incorporate the use of surfactants that form a monolayer type barrier at interfaces between test liquid and atmosphere (for example, in FIGS. 1 and 5) and also to promote wettability.

Therefore, a unique capability results, one that can be utilized for identifying individual special materials and threats from gamma emitting fission product based "dirty" bomb packages.

In accordance with an embodiment of the invention, a centrifugal metastable state-inducing system 10 shown in FIG. 1 detects neutrons of various energy levels in a high gamma ray background. Metastability in this case is induced by introducing a tension force on the molecules of the liquid 12 in the central bulb region of an enclosure 14 at the base of the two arms 16, 18 of the diamond-shaped spinner 20. The enclosure 14 is mounted to a holder 22, which in turn is coupled to a motor 24. As such, the motor 24 spins the enclosure 14 to create the tension force on the molecules of the liquid 12. A feature of the centrifugal system 10 shown in FIG. 1 is that once the liquid 12 in the central region of the enclosure 14 nucleates a vapor pocket, the vapor pocket then grows pushing the liquid outwards in lower portion of the arms 16, 18 and then inwards in the upper portions of the respective arms. The filling of the arms 16, 18 with the liquid raises a weight or projectile 25 that sits on top of the arms 16, 18; the projectile falls as the vapor pockets collapse. This becomes a convenient means for ensuring that a nuclear particle has been detected and counted in combination with a simple light-sensor switch 26 and a pill-hydrophone 32 attached to the apparatus that records events as low intensity shock waves.

A secondary removable and rotatable enclosure 29 surrounds the aforementioned components. The enclosure 29 is provided with windows 31 to permit directional passage of neutron (n), gamma ($\gamma$), and alpha ($\alpha$) particles to decipher the direction of a nuclear particle.

Figure 2B:
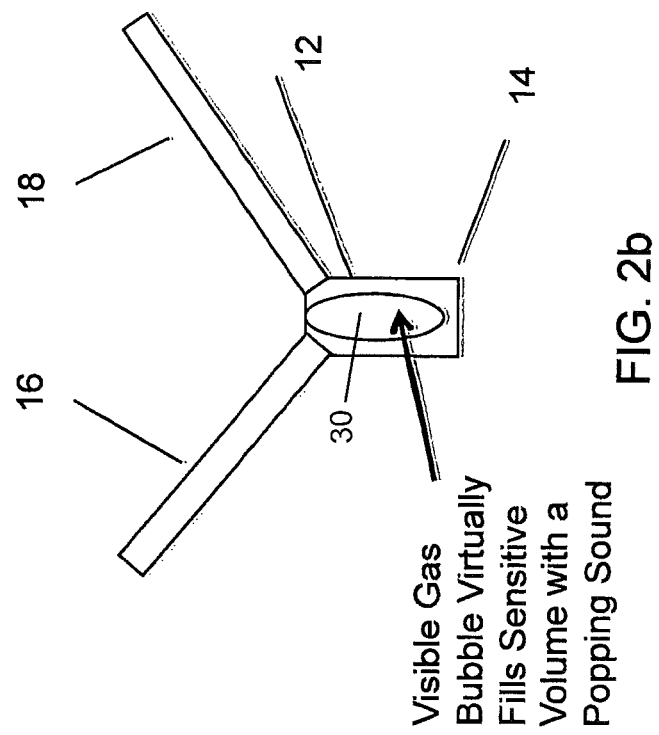
FIG. 2b is an image of the fluid showing a void space created when an ionizing particle interacts with the fluid.

FIGS. 2a and 2b show schematics of the central bulb region in the enclosure 14 illustrating a void space 30 caused when a neutron is detected. Successful testing has been conducted with neutrons from a spontaneous fission source (Cf-252) as well as from an alpha emitting special nuclear material (Pu-239 and Be), and from 14 MeV neutrons generated from a pulse neutron generator. Note that these measurements were taken in a high gamma ray field ($2 \times 10^6$ gamma/second) and as such represents the ability to detect neutron emitters in a high gamma background (as may be the case if neutron emitting SNMs are encased in spent fuel—dirty bombs).

Thus, in particular implementations the system 10 includes the enclosure 14 which generates neutrons upon interaction with alpha particles and which holds the pretreated fluid 12 in combination with an additive, such as B-10, to detect thermal energy level neutrons through absorption. The enclosure 14 may include a surfactant and valving system to minimize or eliminate liquid loss via evaporation and to improve wettability. The motor 24 coupled to the enclosure 14 spins the enclosure 14 to pretension the fluid into a metastable state. The interaction of the nuclear particle with the fluid in the metastable state creates a respective vapor pocket 30. The creation of the vapor pocket results in a shock wave, the intensity of which is associated with a particular type of nuclear particle.

In certain implementations the enclosure 14 is coated with Be or B. The Be or B atoms can be then used to stop alpha particles which after absorption release neutrons in the multi-MeV energy range. The neutrons can then readily penetrate the structural walls and enter the region of space occupied by tensioned metastable liquid. Once there, they then cause nucleation of nanometer size bubbles which quickly (within microseconds) grow to visible multi-milimeter size (as in FIG. 2). This approach permits the same system to also permit the ability to detect not just (penetrating radiation such as neutrons and gammas photons) but also non-penetrating radiation such as alpha particles that get released from special nuclear material atoms such as U-235, U-238, Pu-239. The fluid 12 can be pretreated with pre-compression, degassing or filtration or a combination thereof.

In certain embodiments the liquid chosen includes an atom (for example, Li-6 or B-10) that preferentially absorbs thermal neutrons which then gives rise to a nuclear reaction releasing alpha particles, since eV energy neutrons are too low in energy to cause bubble formation. However, alpha particles that get released from B-10 or Li-6 like isotopes are in the multi-MeV range and can readily, like MeV level neutrons, cause bubble nucleation in tensioned metastable liquids. One such liquid that has been successfully tested for the ability to detect both fast neutrons in the MeV range as well as much lower energy neutrons in the eV range is trimethyl borate which has been found experimentally to not only display capability to detect high energy neutrons in the multi-MeV range but also neutrons that are millions of times lower in energy (that is, in the eV range). Thus, in accordance with the invention, the same detection system can not only provide capability to detect fast neutrons emitted by special nuclear materials but also lower energy neutrons (which result if the special nuclear material is heavily shielded). This capability permits in the same system neutrons of vastly different energies (from MeV to eV and below). Experiments have demonstrated that to detect thermal (eV energy neutrons) and use of trimethyl borate as a model liquid required tension metastable pressures of about −5 bar and more. However, for fast neutrons in the MeV range can be detected with tension in the −3.5 bar range.

Figure 3:
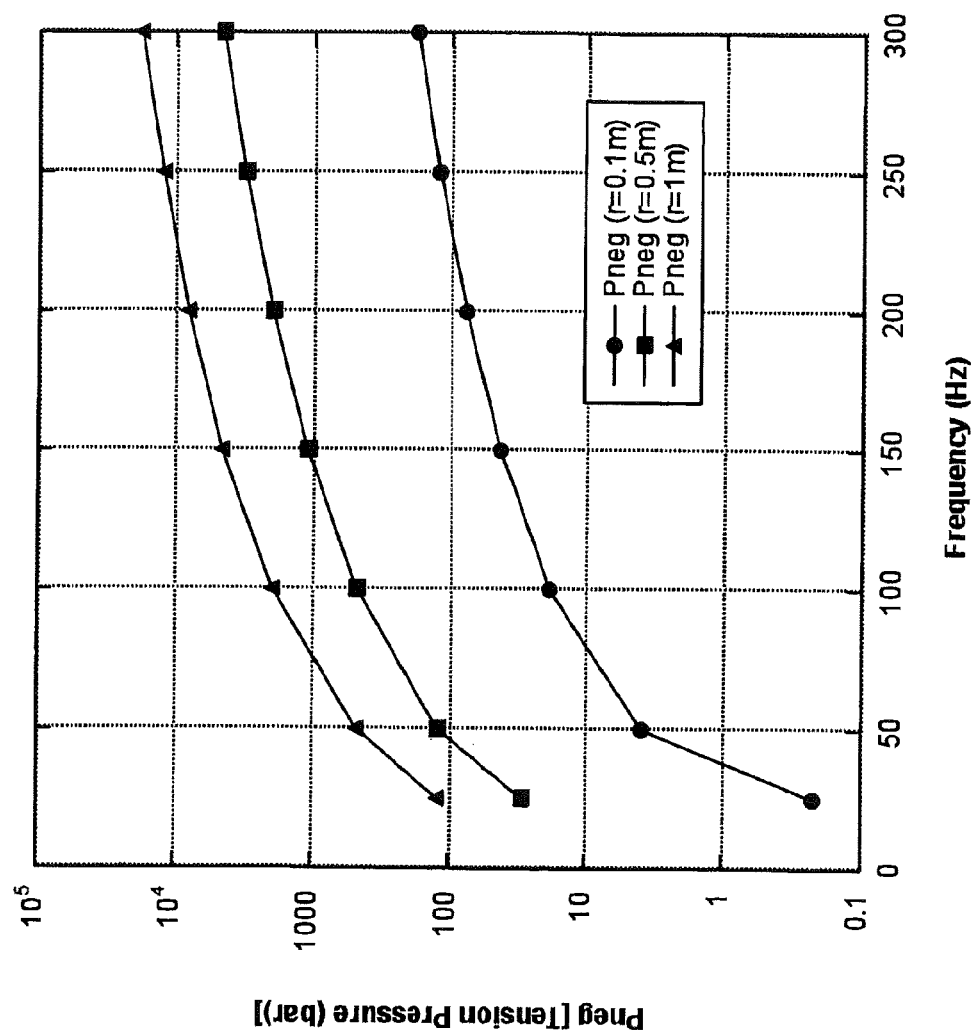
FIG. 3 is a plot showing negative pressure attained via centrifugal force with variations in arm length and frequency of rotation.

The successful attainment of desired states of metastability is achieved by preparation of the liquid and enclosure and upon introduction of tensile states from centrifugal forces during spinning about the central axis. Rotation is achieved by using the motor 24, such as a commonly available Dremel-like tool. Various levels of negative pressures are shown in FIG. 3. Since 5 MeV type neutron energy based nucleation can be readily attained with about −3 bar of molecular tension and metastability in a range of fluids (for example, isopentane, R-113, trimethyl borate and other liquids with similar physical properties of surface tension, vapor pressure, density and viscosity), and the fact that simple drivers like Dremel-tools can provide up to 50,000 rpm, a large range of neutron energies can be readily accommodated. The detection of particles is related to a combination of key parameters: degree of tension metastability, temperature and the linear-energy-transfer (LET) of the incident nuclear particle. Greater the LET, less is the required state of metastability, as a consequence of which gamma ray detection requires greater states of mestability—but still well within the purview of various embodiments of the invention. In other implementations, the state of metastability includes detection of gamma rays in combination with neutrons and alpha particles. Using the kinetic theory for nucleation under negative pressure conditions also permits the estimation of the limits of tension pressure, $p_{neg}$, using, $$p_{neg} = -\left[\frac{16\pi}{3}\frac{\sigma^3}{kT\ln(NkTt/h - \Delta f)}\right]^{1/2} \quad (1)$$

where k and h are the Boltzman and Planck constants, σ is the surface tension, t is the waiting time, Δf is assumed to be the activation energy for viscosity and T is the liquid temperature, respectively.

As seen from Eqn. (1), the threshold $p_{neg}$ pressure can be expected to vary roughly with the surface tension (to the exponent 1.5). Using data taken for a variety of liquids a comparison was made to evaluate whether Eqn. (1) could be used to predict experimentally observed trends and values of limiting tension.

TABLE 1

Measured and predicted negative pressure thresholds for various liquids.

| | Negative pressure thresholds (bar) at ~20° C. | |
|---|---|---|
| Liquid | Highest Measured Value | Predicted [Eqn. (1)] |
| Aniline | −300 | −654 |
| Acetone | Not available | −272 |
| Acetic acid | −288 | −334 |

TABLE 1-continued

Measured and predicted negative pressure thresholds for various liquids.

| | Negative pressure thresholds (bar) at ~20° C. | |
|---|---|---|
| Liquid | Highest Measured Value | Predicted [Eqn. (1)] |
| Benzene | −288 | −360 |
| Chloroform | −317 | −333 |
| Trichloroethylene | −274 | −370 |
| Water | −1,400 | −1,500 to −1,700 |

Interaction of Nuclear Particles with Tensioned Metastable Liquids

Once a pre-determined state of tension metastability is attained, the determination of how much energy can be transmitted to a given set of molecules when the nuclei of the atoms are subject to neutrons, alphas, fission products or gamma photons is made.

The traverse of energetic ionizing particles in a medium gives rise to energy transfer to that medium, for which a figure of merit that is commonly used is linear-energy-transfer (LET). In order to estimate the LET for various target atoms from interaction with neutrons or other particles such as alphas and fission products, the well-known Bethe approximation can be employed. The stopping power, the rate of energy loss per unit path length (dE/dx), for heavy particle of charge ze is given by, $$-\frac{dE}{dx} = \frac{4\pi z^2 e^4}{m_e v^2} nZ\left(\ln\frac{2m_e v^2}{I} - \ln(1-\beta^2) - \beta^2\right) \quad (2)$$

where, ze is the charge of the primary particle, Z is the atomic number of the absorber atom, β=v/c, with v the particle velocity, c the velocity of light, n is the number of atoms per unit volume of absorber, and I is the mean ionization potential. At the same velocity, alpha particles has a higher z value compared with protons and lose energy four times as fast.

The above formula of Eqn. (2) for dE/dx provides useful clues on energy deposition by looking at the term before the terms in parenthesis. It is seen that as the density of the absorber increases, the stopping power increases. The stopping power is also linearly dependent on the value of nZ, which represents the electron density of the absorber. Therefore, Cl atoms with a Z of 35 stops 35 times faster than a proton for which Z=1. The dependence with speed of motion, v, of the charged particle is even more noteworthy. As the energy decreases, the energy deposition in space increases. As mentioned previously, since the energy transfer to high-Z nuclei is smaller, this results in the high-Z target nucleus depositing it's energy over a smaller distance. The Bohr formulation may be employed; however, this formulation does not include the effect of energy of the charged particle and thus, for the present is not used. In addition to stopping power and dE/dx, every nuclear particle has a certain probability of interaction based on energy of the incident particle and the various atoms in the liquid molecules. It has been found, for example, that despite the fact that methanol and acetone have similar physical properties, the threshold for nucleation and detection are significantly different (that is, methanol can be detected with only about −5 bar of tension metastability, whereas, for acetone about −7 bar may be needed). The interaction probability has been verified experimentally and also confirmed by MCNP nuclear transport code calculations.

This provides the mechanism for choosing the appropriate liquid for a targeted tension metastable level and type and energy of the incident nuclear particle. The waiting time for detection is controllable and found possible to bring down from ~20 s at the threshold tension metastable level to virtually instantaneous (less than millisecond) by increasing the tension metastable state by ~50% (for example, if, for a given neutron flux, R-113 with about −3 bar of tension metastable state will detect fast neutrons within 20 seconds; however, at −4.5 bar the detection is found to be instantaneous).

The stopping power for gamma ray photons takes into account attenuation from photoelectric, Compton scattering and pair-production. The typical formulation for transmission of I photons from the incident value of $I_o$ is provided as, $$\frac{I}{I_0} = e^{-\mu x},$$

where $\mu$ is the linear attenuation coefficient and x is the distance over which attenuation takes place. The value of m is usually tabulated for a variety of materials and liquids. Alternately, to obtain LET, the above equation may be rewritten as $dI/dx=-\mu I$.

Determining Energy Required for Triggering Nucleation in Tensioned Metastable Fluids To nucleate bubbles in liquids, kinetic theory of nucleation (see, for example, Fisher, The Fracture of Liquids, Journal of Applied Physics, Vol. 19, November 1948 pps. 1062-1067) provides that a critical radius be reached beyond which only can a vapor bubble begins to grow; otherwise, that bubble will go back to the liquid phase. Using the thermal-spike theory (originally developed by Seitz, On the Theory of the Bubble Chamber, The Physics of Fluids, Volume 1, Number 1, January-February 1958, pps. 2-13) to predict events in a conventional bubble chamber) the energy required (W) for an incidental particle collision can be estimated as the sum of five terms as follows:

$W_1$=Surface energy=$4\pi r_c^2 \sigma$ (3)

$W_2$=pdV work done by bubble during expansion=$4/3\pi r_c^3 \rho_{ext}$ (4)

$W_3$=enthalpy of evaporation=$4/3\pi r_c^3 \rho_v h_v$ (5)

$W_4$=kinetic energy given to the liquid=$32\pi D^2 \rho_1 r_c$ (6)

$W_5$=viscous losses in moving liquid away=$64\pi v D r_c$ (7)

where $r_c$ is the critical radius (=$2\sigma/(\rho_v-\rho_{ext})$), D is the thermal diffusivity, $h_v$ is the enthalpy of evaporation and v is the liquid viscosity.

The available energy from alpha recoils over the length corresponding to the size of the critical bubble diameter was compared with the computed energy for vaporization of the critical size bubble for both the positive pressure cases and for the negative pressure cases. Results of the comparisons are summarized below in Table 2. As is shown in Table 2, Seitz, On the Theory of the Bubble Chamber, The Physics of Fluids, Volume 1, Number 1, January-February 1958, pps. 2-13) thermal spike theory gives results which match data taken at positive pressures (in bubble chambers where the nuclear particles are alpha recoils from dissolved emitters like Po) very well indeed. However, the same theory, when directly applied to nucleation for liquids under negative pressure (that is, tension metastability) indicates that a factor of 5 less energy may be needed for nucleation. The theoretical basis provides an estimate of the tensioned metastability level (order of magnitude) required for detection of nuclear particles. The actual computation of particle interaction and nucleation energy may be provided by nuclear particle transport calculations, such as well-established codes including MCNP and supplemented with actual empirical evidence.

TABLE 2

Comparison of Nucleation Energy Thresholds for Positive and Negative Pressure Liquids

| Test Liquid | Freon-12 | Freon-113 |
|---|---|---|
| $r_c$ (A) | 860 | 635 |
| $W_1$ | 4.9 | 5.6 |
| $W_2$ | 8.7 | 3.5 |
| $W_3$ | 94.7 | 2.9 |
| $W_4$ | 0.3 | 0.2 |
| $W_5$ | 1.8 | 3.2 |
| Total W(keV) | 110.4 | 15.4 |

In the embodiment shown in FIG. 1 it is not necessary that the drive motor 24 be placed below the diamond-shaped spinner; the drive motor (Dremel-like tool) may also hold the top of the diamond-shaped spinner to introduce centrifugal force to the fluid in the central bulb. In such a system once the nuclear particle is detected a void/bubble forms as shown in FIG. 2B. Thereafter, the system is stopped to allow the gas bubble to escape from the arms after which liquid re-enters the central bulb and the detector is re-armed for detection again.

Figure 5:
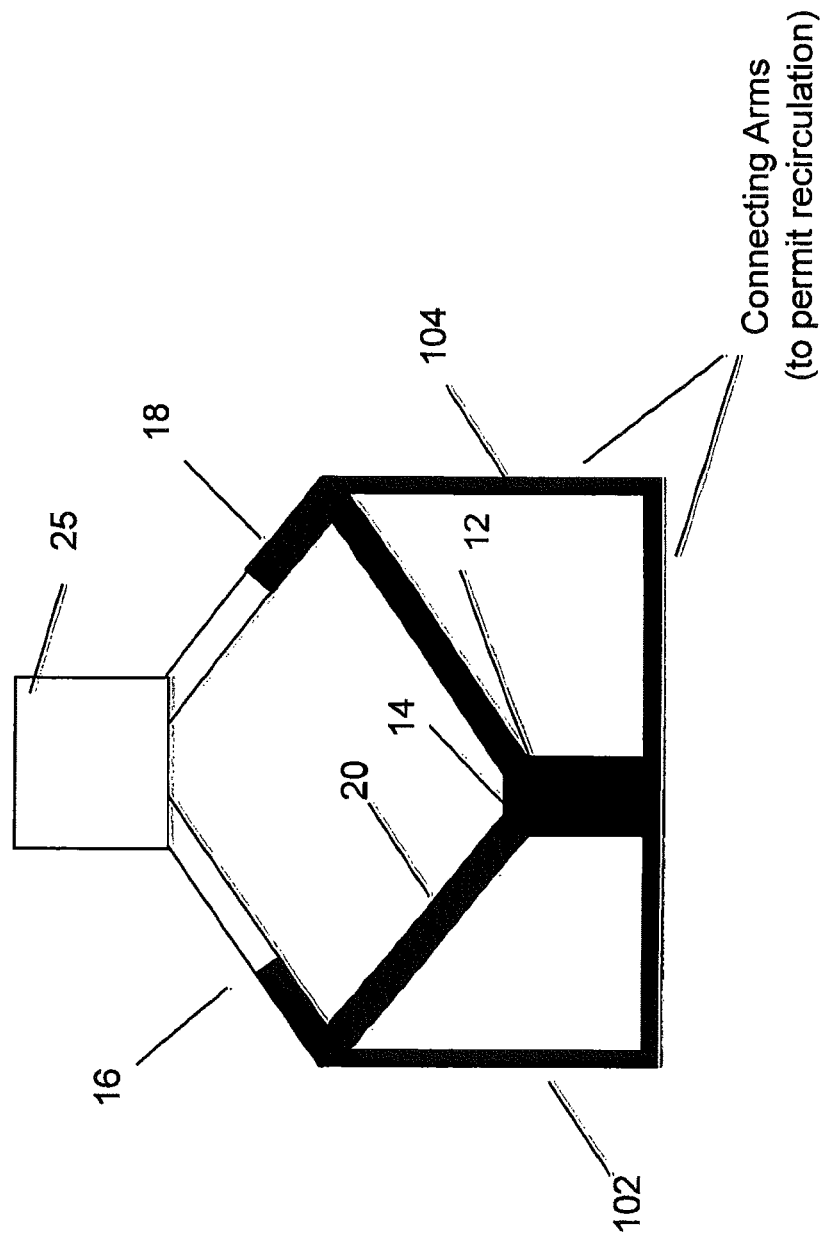
FIG. 5 is a schematic of a centrifugal force based system that permits continuous recharging without stopping in accordance with an embodiment of the invention.

Alternatively, FIG. 5 shows an embodiment 100 in which the spinning about the central axis creates a motive force to circulate the liquid continuously through the use of connecting arms 102, 104. A nucleation event that causes a gas bubble to form in the central bulb region 14 can then also continuously move the gas bubble along with the liquid away from the central bulb continually filling the central bulb such that it is not necessary to stop the apparatus. The gas bubble moving upwards to the liquid-gas interface lets gas escape but the liquid keeps recirculating. Of-course, if the test liquid is thoroughly degassed to begin with, only vapor bubbles can form which would re-condense back into the liquid phase upon evacuation from the central bulb region.

Figure 4:
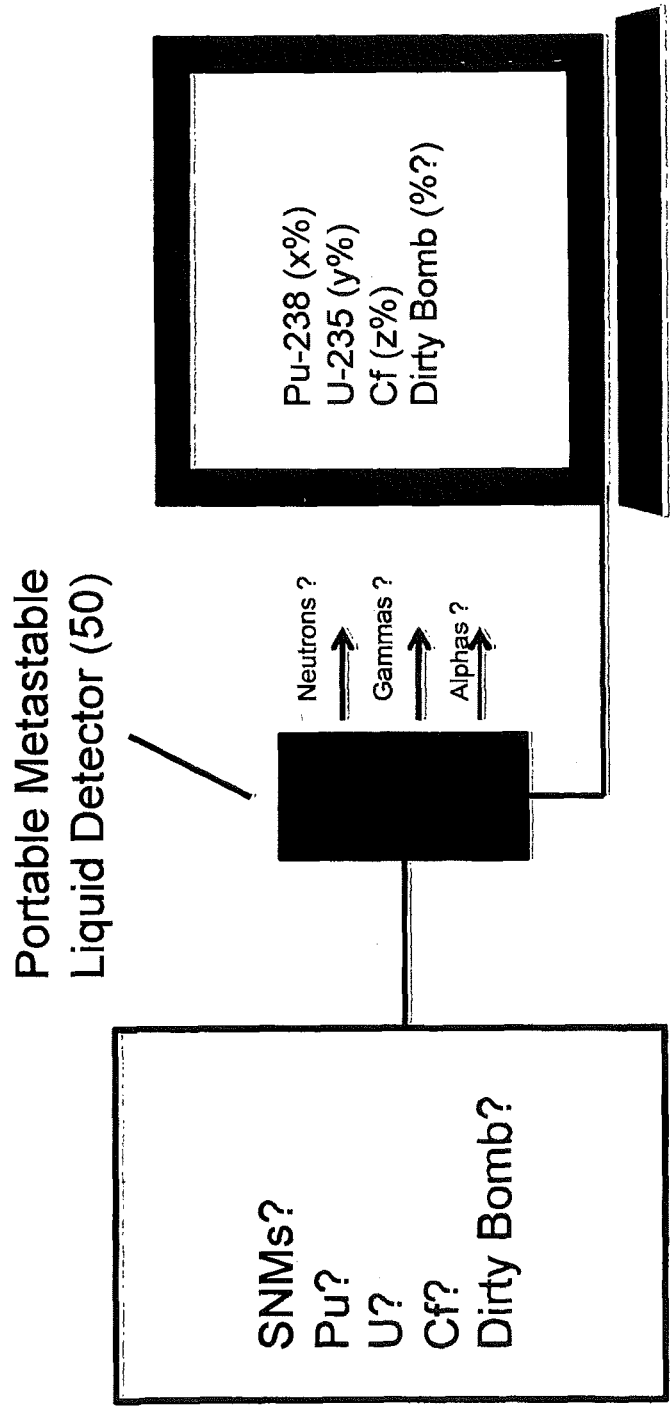
FIG. 4 is a composite detector-logger system for the system shown in FIG. 1 in accordance with an embodiment of the invention.

As shown in FIG. 4, in accordance with the invention, a portable TMFD system 50 for detection of fission spectrum range neutrons from Cf-252 and Pu—Be sources, as well as 14 MeV monoenergetic neutrons from a pulse neutron generator has a wide range of neutron and gamma energy capabilities. Moreover, the system 50 can be employed in applications with lower and higher states of metastability for detection of alpha particles and gamma rays characteristically emitted from special materials (like Pu and U isotopes) and fission products like Cs-137 and Co-60, which drives the tensioned states to much greater levels. The aspect of distinct separations of metastability required for distinguishing neutrons from alpha particles and gamma rays can be used in software developed to identify SNMs on a portable PC platform as depicted in FIG. 4. In certain implementations, the TMFD system 50 detects neutrons, gamma rays and alpha particles.

When compared to conventional detectors, various embodiments of the invention may provide one or more of the following advantages. The cost of a centrifugal portable TMFD system 50 can be at least an order of magnitude less than that of a liquid-scintillator system doing PSD (needing a HV supply, preamp, amplifier, pulse shaping system, MCA/

MCS, and the related expertise) or for a BF3 detector system. Even an SDD-based system may cost a factor of two or more than the cost of a liquid-scintillator system.

The TMFD system 50 is transparent even for the non-physicist type user. It is a simple mechanical system that can be put together and used by others without having special training in nuclear physics or instrumentation. The sensitive volume of the TMFD system can be made large relative to conventional systems at little or no additional cost or complication. Compared with SDD the sensitive space for nucleation per cc is about 1000 times larger. The sensitivity level of the TMFD system 50 can be varied at will rather than having a fixed sensitivity as typically found in SDD systems. The TMFD system 50 can detect neutron emitting isotopes blanketed in a large mass of gamma emitters (as in a dirty bomb) because of its fast neutron detection capabilities in high gamma background. In various implementations, depending on the tension level, the TMFD system detection can be set for neutrons only of various energy levels and/or for gamma ray detection of various energy levels. Since the lifetime of the TMFD detector in certain implementations depends largely on the rotating parts—parts that are simple and relatively cheap to replace, the TMFD system 50 may have greater longevity as compared to conventional systems.

The TMFD system 50 can be set to a desired detection level on demand by varying the level of tension, as compared to SDD systems which have to be recharged. When operated as a spinner system, the TMFD system 50 can be operated in an intermittent mode, and when implemented as an acoustic system (consisting of a simple chamber driven only with a pulser and amplifier) the TMFD system can be operated continuously.

The complete system enables a single, hand-portable detector (the size and weight that is commonly associated with Dremel-tools and ultrasonic toothbrushes) to detect neutrons, gamma rays and alpha particles relevant to identification of special materials like U or Pu coupled with gamma emissions from spent nuclear fuel.

The TMFD system 50 implemented, for example, as a small hand-held device, can be fixed in place, or carried in a suitcase or pocket and activated at will to act as an as-desired detector for selected nuclear particles. The freedom to be able to detect a wide range of nuclear particles emanating from a range of special radioactive materials with a portable TMFD system enables radiation detection for interdicting smuggling and terrorist threats as well as for inventory taking. In general, the TMFD system 50 can be tailored for specific situations involving nonproliferation.

Figure 6A:
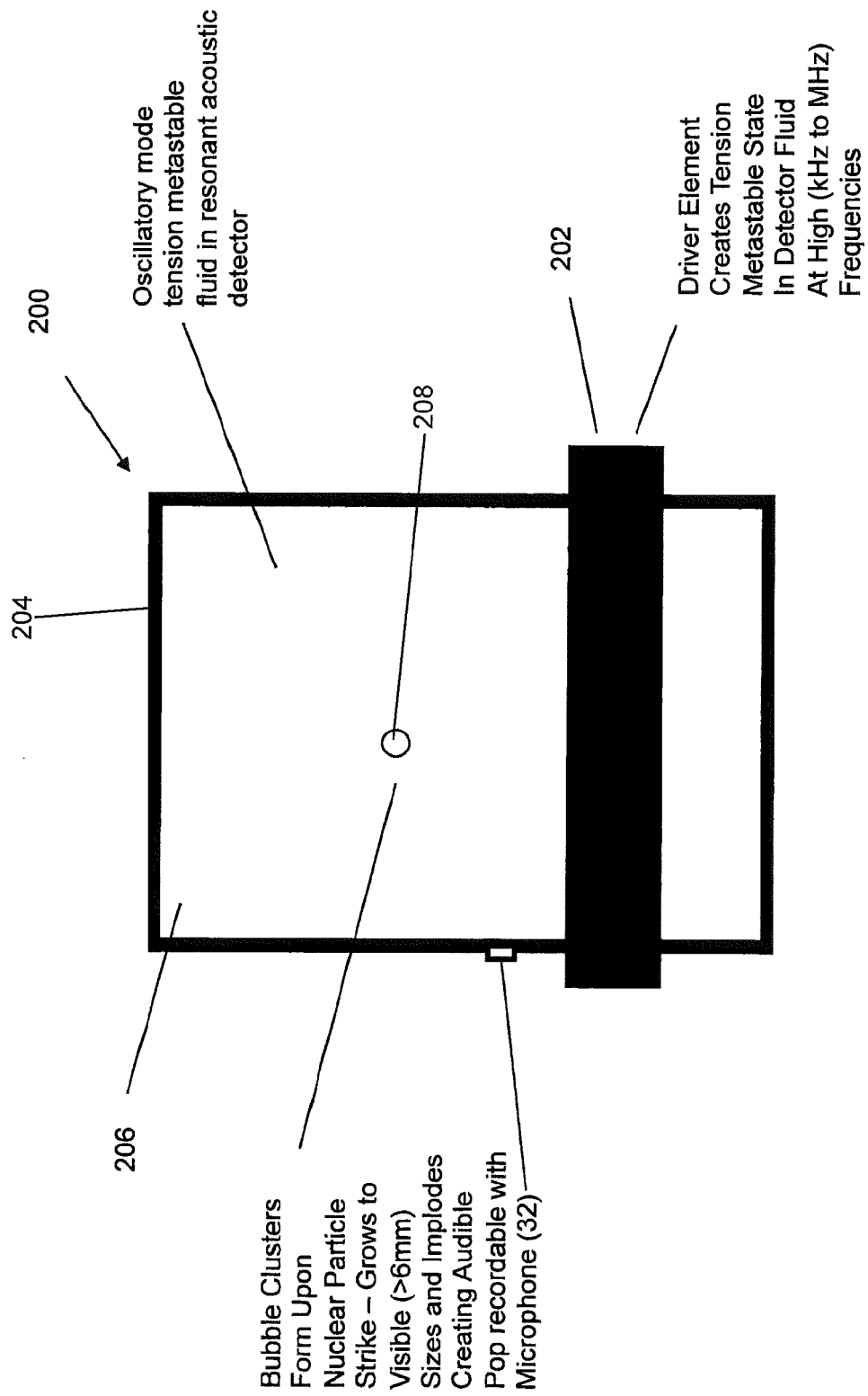
FIG. 6a is a pictorial view of a resonant acoustic test cell, in accordance with another embodiment of the invention.
Figure 6B:
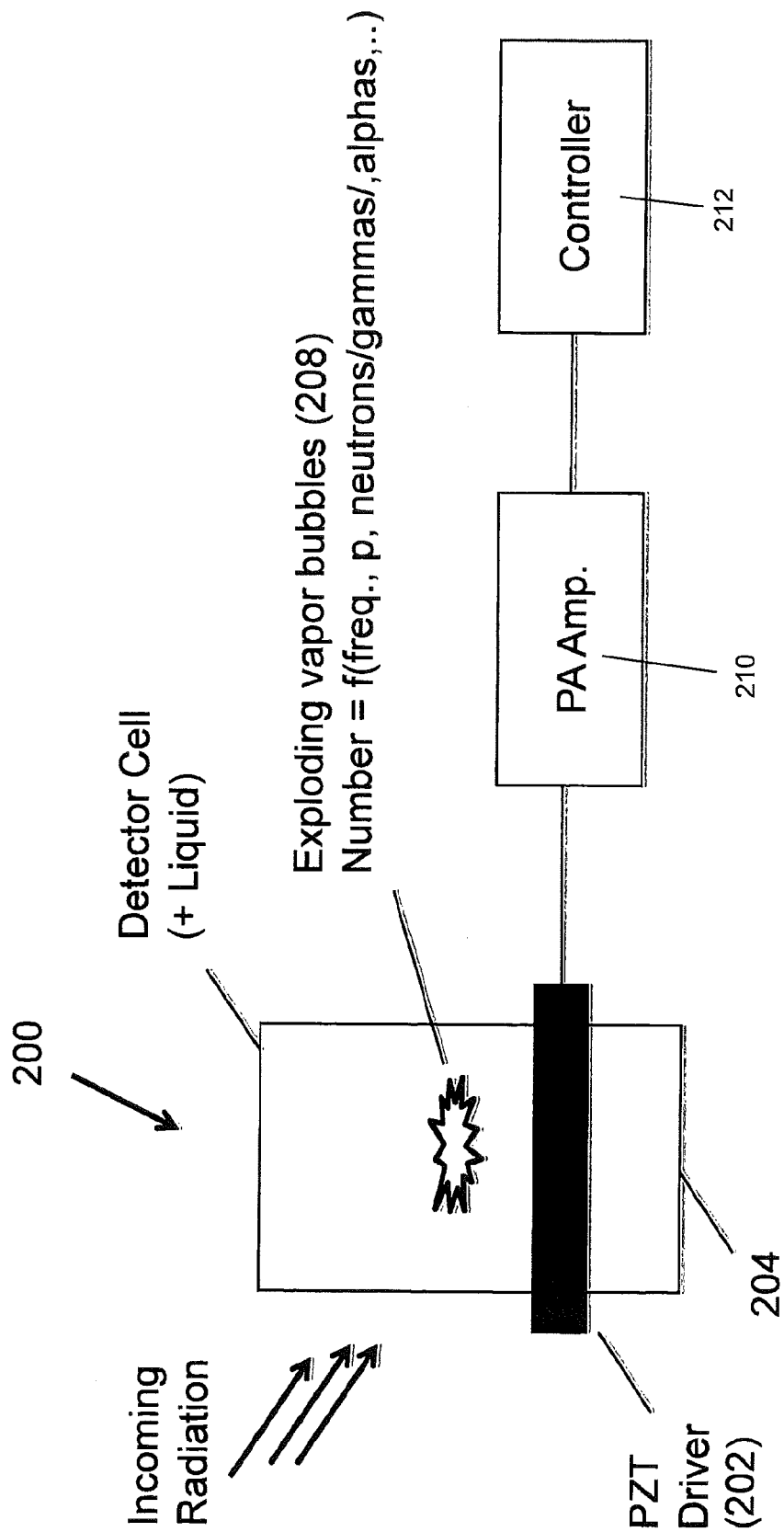
FIG. 6b is a schematic view of the electronic train of components for the resonant acoustic test cell operation in accordance with an embodiment of the invention.

Other embodiments of the invention are also contemplated. For example, as illustrated in FIG. 6a, a system 200 includes an enclosure 204 containing a liquid 206 acoustically driven by a piezoelectric driver element 202. The piezoelectric driver element 202 induces the desired shape, amplitude and frequency to pretension the liquid 206 into a metastable state. A bubble cluster 208 forms upon a nuclear particle strike. This bubble cluster grows to visible sizes and implodes creating an audible shock wave that is recordable by a microphone. The intensity of the shock wave is associated with a particular type of nuclear particle, such as neutrons, gamma rays, and alpha particles, as well as fission products. As shown in FIG. 6b, the system 200 may be configured as a resonant acoustic test cell that continuously operates at, for example, 20,000 Hz or higher, through the use of a PA amplifier 210 and a controller 212.

Similar to the arrangement for the system 10, the system 200 may include a secondary removable and rotatable enclosure that surrounds the nuclear detector and includes windows to permit directional passage of neutrons, gamma rays, and alpha particles to decipher the direction of a nuclear particle. The liquid may be pretreated with pre-compression, degassing, or filtration, or a combination thereof. The fluid may include one or more additives such as boron or trimethyl borate to absorb low energy neutrons (in the eV range) resulting in alpha recoils which then result in nucleation and detection. The additive may be B-10.

Figure 6C:
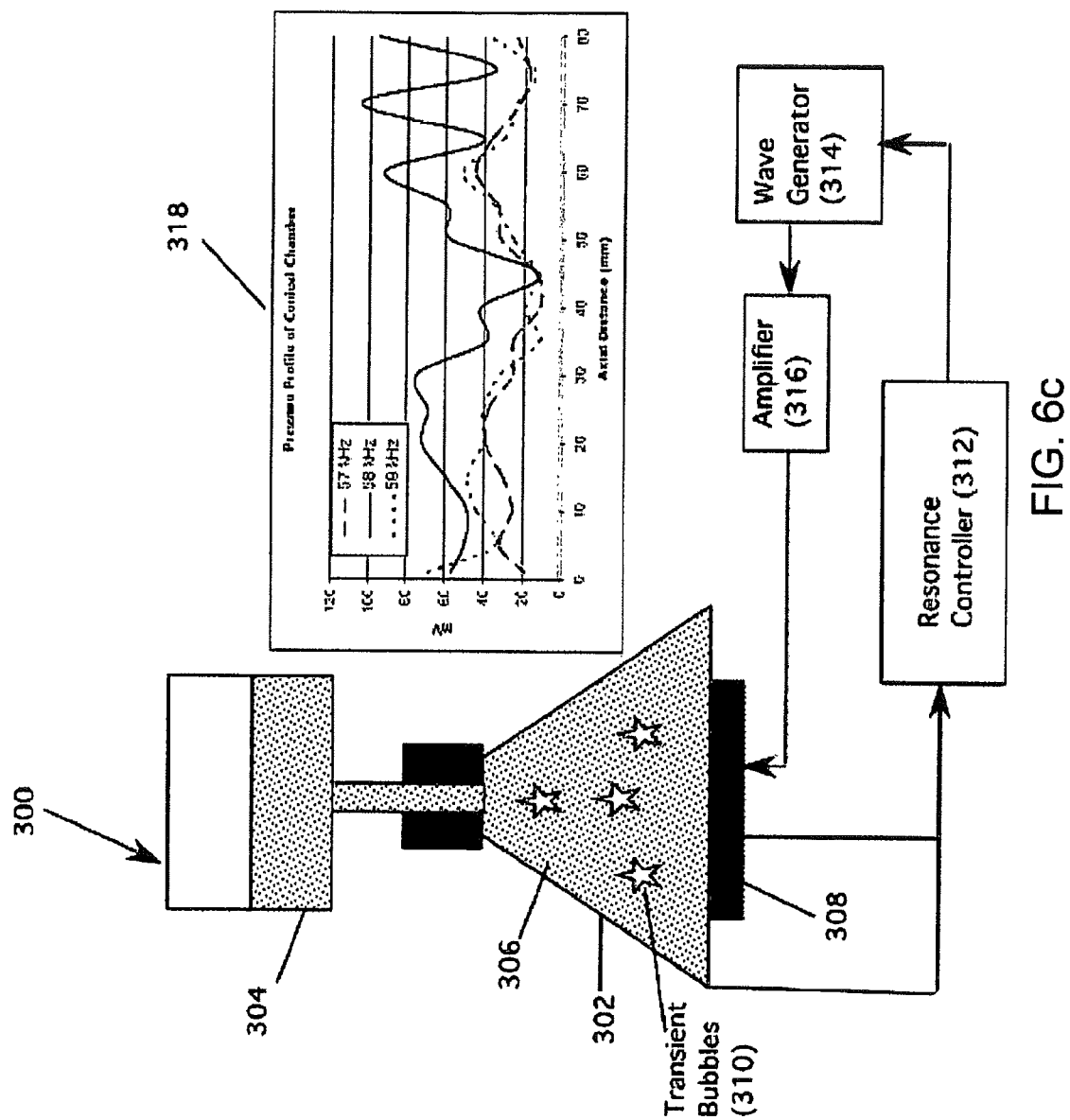
FIG. 6c is a schematic view of detector components and electronic train of components for a conical design system resonant acoustic test cell operation.

FIG. 6c illustrates yet another continuously operating detector system 300, which is a conical design system resonant acoustic test cell operation that includes appropriate electronic components for detection of neutron, gamma rays, and alpha particles, and fission products. Similar to the conical design, a spherical design with the PZT element 308 strapped to it's side on the equator or as a set of disks around the circumference.

Specifically, the system 300 includes a conical enclosure 302 coupled to a reservoir 304. The enclosure 302 holds a liquid 306 that is in tension as the enclosure is acoustically driven by a piezoelectric element 308. As bubbles 310 form by neutron strikes, the liquid is pushed into the reservoir 304. The system also includes a resonance controller 312, a wave generator 314, and an amplifier 316 to drive the piezoelectric element 308, for example, at or above 20,000 Hz. Also shown in FIG. 6c are the pressure profiles 318 at various frequencies to predetermine the sensitive zones (illustrated as stars) in the liquid 306.

Figure 7:
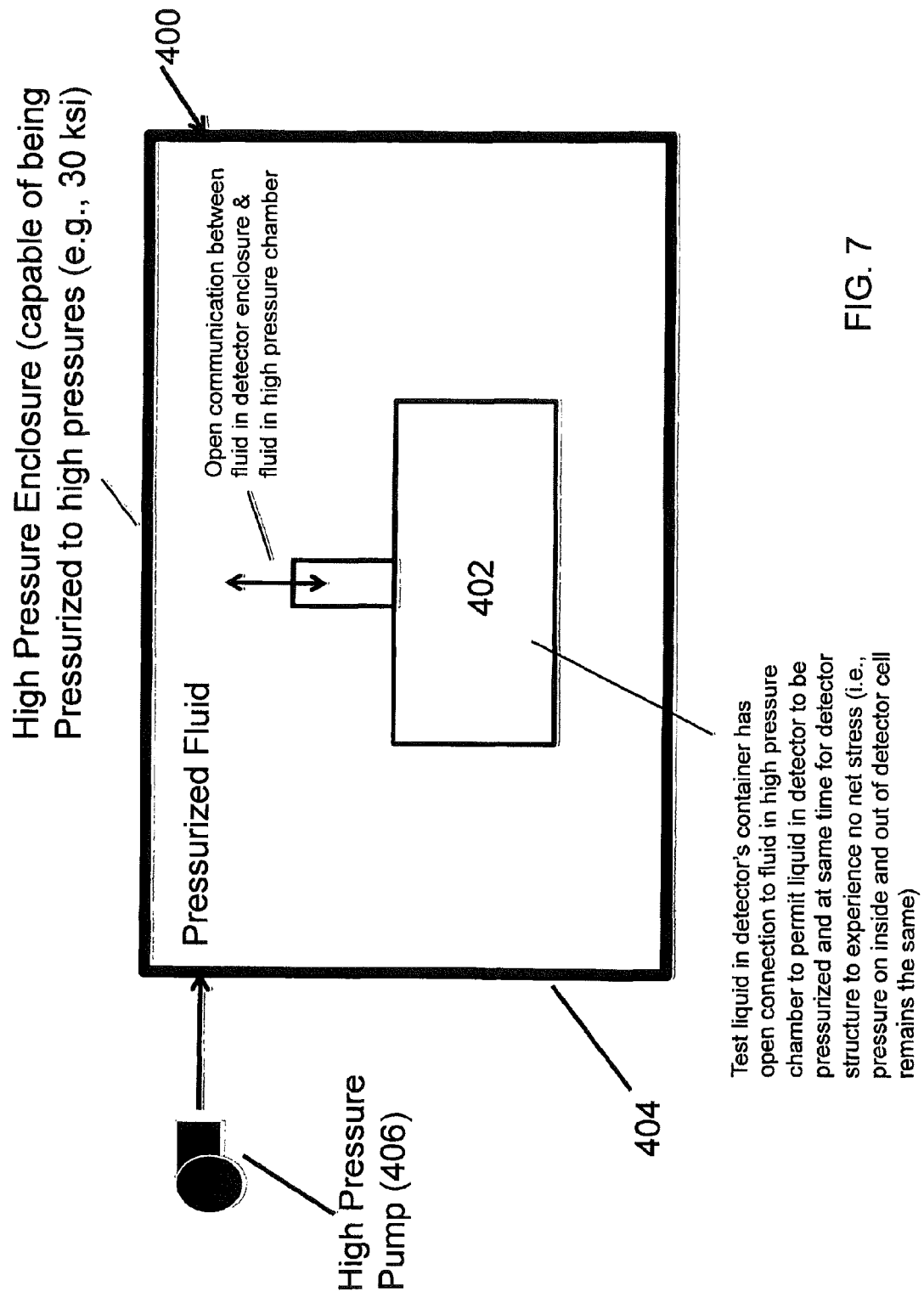
FIG. 7 is a schematic view of the detector enclosure with test fluid or the test fluid in a container being subjected to pretreatment to result in desired levels of amorphous states to prevent false positives.

In another embodiment of the invention shown as a detector system 400 in FIG. 7, the detector enclosure with test fluid is subjected to pretreatment to provide desired levels of amorphous states to prevent false positives (that is, precompression in a high-pressure chamber). Specifically, the system 400 includes a detector enclosure 402 positioned within a high pressure chamber 404, which can be pressurized, for example, to about 30 ksi through the use of a high pressure pump 406. There is open communication between the detector chamber 402 and the high pressure chamber 404 to permit the liquid in the detector chamber to be pressurized while the detector chamber experiences no net stress; that is, the pressure on the inside and the outside of the detector chamber 402 remains the same.

The detection of low energy (eV) neutrons may be further enabled with inclusion of N-14 into the test liquid. The interaction of thermal energy neutrons with N-14 results in a (n,p) reaction with a Q value of 0.626 MeV. This gives rise to an energetic proton which can be readily detected within seconds in a host tension metastable liquid such R-113 at tension levels of around −3 bar. Introduction of N-14 (which is the naturally occurring isotope of nitrogen) may be accomplished by using a soluble N-bearing molecule such as a nitrate form which is readily soluble in water and which then may be mixed with the host solute such as acetone.

The detection of thermal neutrons may be further enabled by inclusion of fissile atoms which have high cross-sections for interaction. The process leads to energetic ionizing high-Z products of reaction enabling ready detection. Salts of fissile atoms such as uranyl nitrate or thorium nitrate or in acetate form are preferable due to their ready solubility in the host liquids such as acetone, etc. Particular isotopes of choice along with their probabilities of interaction with thermal neutrons in barns are: U-235 (531 b); U-233 (582 b); Pu-239 (742); Pu-241 (1009 b); Np-236 (2500 b), Th-233 (15 b). Alternately, Th-232 may also be employed due to the 7.4 b cross-section which produces energetic alpha recoils.

The detection of fast (MeV) neutrons with fission assist may be enabled with the addition of isotopes such as U-238

(for energies above about 0.6 MeV) and also as a means for delineating incoming neutron energies.

Earlier we have noted that external alpha particles may be detected with 0.01 mm to 1 mm thick coatings of Be or B to the outer walls of the enclosure holding the tensioned metastable liquid. This function may be further attained with use of other elements such as Li-7, C-13, and F-19 which exhibit "Q" values of reaction of −2.79 MeV, 2.2 MeV, and −1.93 MeV, respectively. These "Q" values are noted in comparison to the "Q" values for B-10, B-11, and Be-9 viz., 1.07 MeV, 0.158 MeV, and 5.71 MeV, respectively. The "Q" value correlates as a rough measure of the efficiency of conversion of alpha interactions with the target nucleus. As a consequence, for alpha energies in the 5 MeV range, the conversion efficiency (in terms of # neutrons per million incident alphas) may be computed as: Be (70); B-10 (13); C-13 (11); F-19 (4.1) respectively. Such specific characteristic may further be used to devise level of efficiency for detection on as-needed basis. For example, in an extremely hot radioactive environment, one may decide to use a coating of B (which is much less expensive) than Be. Also to be noted is that the elements considered herein allow detection of alphas of wide energy such as 3.18 MeV alphas from Gd-148 to 6.6 MeV alphas from Es-253 (including alphas from strategically important U-235, Pu-239 and Am-241 isotopes which are 4.4 MeV, 5.1 MeV and 5.48 MeV respectively).

The detection of external gamma photons may be further enabled by use of D and Be elements either in the test liquid itself or as a coating. Gamma photons of minimum energy greater than 2.22 MeV and 1.6 MeV may then be possible to detect via detection of the emitted neutrons that strike the tensioned liquid as discussed earlier.

The detection of gamma photons may be further enabled by including high "Z" elements into the test liquid itself. From Eq. (2) we have noted that dE/dx is directly proportional to the Z number of the target atom. Although gamma photons may be detected without high Z elements by increasing the tension pressure by roughly factor of 10 (i.e., about −35 bar in R-113 instead of −3.5 bar for fast neutrons), it would be desirable to not have to tension the liquid to such high negative pressures for enabling a less structurally robust system. For such cases, high "Z" elements may be considered to be added to the test liquid. Example high "Z" elements are Pb (Z=82) and I (Z=53). Lead acetate and molecular forms of I such as KI and NaI are examples. Particularly NaI due to it's ready solubility in an array of potential host liquids (e.g., 28 g/100 g of acetone; 63 g/100 g and 184 g/100 g of water at 25 C). Such concentrations offer the possibility of increasing dE/dx by factors of up to 10 or more and hence the negative pressures may for example be reduced from about −35 bar to a more practical level of about −10 to −15 bar. Such detection mode also offers the ability to see visible tracks in the multi-mm length scale so as to simultaneously offer the ability to note directionality of the incoming photons.

The ability to note detectability has been noted earlier to rely on either mechanical shocks generated from nucleated bubbles, the use of a photoswitch-light beam combination or the use of a retractable stopper which receives the mechanical impulse of the rapidly expanding bubble and then moves physically—an aspect which may be recorded visually or via other means such as meter or video. The retractable stopper as shown in FIG. 1 (item 25) is a generic element which is to be presumed as available as a technique for incorporation into the acoustic based systems of FIGS. 6a, 6b and 6c respectively. That is, any bubble nucleation event sends a mechanical impulse in all directions such that if a mechanical float (25) were placed at the liquid-air boundary, that object would then move to extents commensurate with the energetics of the situation (i.e., less the energy of the particle more the tension level needed for detection and greater the size of the exploding bubble and hence, greater is the motion of the retractable element (25) as also the resulting shock waves monitored by the external microphone (32).

An additional means to enable monitoring and recording of the detection event (i.e., when bubbles are formed due to particle-tension fluid interactions) is the generation of light flashes from the process known as sonoluminescence (SL) as the expanded bubble implodes and collapses. The SL flashes are typically in the pico second duration range and the number of emitted photons in the visible range are proportional to the intensity of implosion, which is furthermore, a function of how large the bubble gets before implosion, which is furthermore, an indication of the energy of the particle being detected as mentioned above. Therefore, a means can now be devised to record the SL intensity with a system such as a photo-multiplier tube, photo-diode or other such ordinary light detection apparatus. The SL intensity, as with the mechanical shock intensity may now be used readily to relate to the energy and type of the particles being detected.

An alternate means for deriving a continuous centrifugally tensioned metastable fluid detector (CCTMFD) is enabled as shown in FIG. 8. The task for deriving a continuously operating CCTMFD system with a reservoir (500) is addressed via demonstrating the ability to use fluid passing through the rotating arms (501) of the CCTMFD as a pump. FIG. 8a depicts such a system successfully tested for ability to function as a pump when the Y-shaped system is rotated with a Dremel-tool motor as in FIG. 1. Alternately, the function may be devised by pressurizing the liquid in the master reservoir itself. The pumping action of the rotating arms (as in the CTMFD of FIG. 1) causes suction pressure that elevates liquid from a reservoir. If the liquid were to now be passed through a venturi (502) or an orifice the desired tension metastable states can readily be derived in a flowing medium. If so, the bubble formation event upon neutron interaction would not require system stoppage (as in the CTMFD of FIG. 1. We now present the theoretical methology for attaining negative (sub-zero) pressures in CCTMFD systems with the venturi (or orifice) principle. The basis is explained using two levels of analyses.

1-D, Incompressible, Inviscid flow modeling based on the well-known Bernoulli Law First, the fundamental ability to attain desired levels of negative pressures starting from a given pressure head ($P_1$) and then driving flow against ambient (atmospheric) pressure can be simply depicted using the well-known Bernoulli Principle (BP) for energy conservation.

For a one-dimensional (1-D), inviscid, incompressible, steady state flow through a venturi (FIG. 8b) the BP states, $$P/\rho + gh + v^2/2 = \text{Constant} \tag{8}$$

Assume fluid of density "$\rho$" at velocity $v_1$ is driven due to a head pressure ($P_1$) in a control volume with area, $A_1$ into another control volume of area, $A_2$ at the same elevation. Equation 8 provides the relationship between $P_1$, $v_1$, $P_2$, and $v_2$ $$P_1 - P_2 = 0.5 \times \rho \times (v_2^2 - v_1^2) \tag{9}$$

Eqn. (9) needs to be combined with the mass conservation equation, $$\rho A v = \text{Constant} \tag{10}$$

In order to attain a given pressure $P_2$ the flow area, $A_2$, can be calculated as, $$A_2 = (v_1/v_2) A_1 \quad (11)$$

For example, if working with a liquid of density=1,000 kg/m³, if $P_1$=3 bar, $v_1$=1 m/s, $P_2$=−3 bar, $A_1$=1 cm², ρ=1000 kg/m³, we calculate the values for $v_2$ and $A_2$ as 36 m/s and 0.277 cm², respectively. Velocities in the range of ~1 m/s should be readily attainable at the entrance of the venturi in the CCTMFD configuration at modest rotational speeds.

Validation Via 2-D Incompressible Computational Fluid Dynamics (CFD) Simulation

A similar problem was modeled using the well-established FLUENT CFD code system. For a venturi with a throat flow area diameter of about 0.25" and a pressure difference of 2 bar from the drive chamber to atmospheric pressure at the exit end of the venturi, the pressure and velocity profiles were obtained for water as the test fluid (assuming negligible heat transfer effects). Results of CFD simulations indicate that in the throat region the pressure has turned negative to about −4.4 bar after which it recovers to positive pressure values before exiting. The velocity profiles indicate that the maximum velocity is in the throat region, reaching values around 36 m/s. These results are similar in magnitude and scope as those derived from Eqns. (8) through (11) and thus, offer a means to devise a continuously operating CCTMFD system.

Other embodiments are within the scope of the following claims.

What is claimed is:

1. A portable system for detecting neutrons comprising,
   a detector liquid in a first enclosure having walls and a venturi valve system such that the detector liquid can pass therethrough during detector operation, the enclosure affixed to a spinning mechanism for introducing negative pressure in the detector liquid,
   wherein the spinning mechanism is capable of inducing a negative pressure in the detector liquid such that neutron detection can occur in the detector liquid at negative pressure,
   said neutron detection resulting from a detectable neutron-caused vapor pocket in the detector liquid that emits a detectable shock wave upon collapse,
   the portable system for detecting neutrons further comprising
   a neutron detection mechanism that comprises a light beam and a photo-switch for detecting neutron-caused vapor pockets in the detector liquid,
   wherein neutron-caused vapor pocket detections correspond to neutron counts.

2. The portable system of claim 1, further comprising a secondary enclosure surrounding the first enclosure, the secondary enclosure having at least one window to permit directional passage of neutrons thereby limiting said neutrons reaching said first enclosure to the direction of a neutron source.

3. The portable system of claim 1, wherein the detector liquid further comprises an additive selected from the group of additives consisting of N-14 bearing molecules, fissile nitrates or acetates, boron and trimethyl borate, U-235, U-233, Pu-239, Pu-241, U-238, Th-232, Th-233, U-233, and Np-236.

4. The portable system of claim 1, wherein the detector liquid further comprises an additive selected from the group of additives consisting of B-10, N-14, Li-6, and Cl-35.

5. The portable system of claim 1 further comprising, a coating on the exterior surface of said walls of the enclosure, said coating including an element that attenuates incident alpha particles, wherein the element is selected from the group consisting of: Be, B, C, F, and Li and the coating has a thickness in the range of about 0.01 mm to about 1 mm.

6. A portable system for detecting neutrons comprising,
   a detector liquid in a first enclosure having walls and a venturi valve system such that the detector liquid can pass therethrough during detector operation,
   the enclosure affixed to a spinning mechanism for introducing negative pressure in the detector liquid,
   wherein the spinning mechanism is capable of inducing a negative pressure in the detector liquid such that neutron detection can occur in the detector liquid at negative pressure,
   said neutron detection resulting from collapse of a detectable neutron-caused vapor pocket in the detector liquid that emits a detectable audible shock wave upon collapse,
   the portable system for detecting neutrons further comprising a neutron detection mechanism that comprises an acoustic wave monitor comprising an acoustic microphone for detecting audible shock waves resulting from collapses of neutron-caused vapor pockets in the detector liquid,
   wherein audible shock wave detections correspond to neutron counts.

7. The portable system of claim 1 wherein the detector liquid further comprises an additive comprising a high Z element bearing soluble compound.

8. The portable system of claim 1 further comprising, an additive selected from the group of additives consisting of lead acetate; KI; and NaI.

9. The portable system of claim 1, wherein the detector liquid in the enclosure further comprises a surfactant.

10. The portable system of claim 1, further comprising a generator coupled to the enclosure, the coupled generator capable of inducing acoustic pressure oscillations in the detector liquid, thereby creating for transient periods of time regions of high and low pressure.

11. A portable system for detecting neutrons comprising,
    a detector liquid in a first enclosure having walls and a venturi valve system such that the detector liquid can pass therethrough during detector operation, the enclosure affixed to a spinning mechanism for introducing negative pressure in the detector liquid,
    wherein the spinning mechanism is capable of inducing a negative pressure in the detector liquid such that neutron detection can occur in the detector liquid at negative pressure,
    said neutron detection resulting from collapse of a detectable neutron-caused vapor pocket in the detector liquid that emits a detectable shock wave upon collapse,
    the portable system for detecting neutrons further comprising a neutron detection mechanism that comprises
    a photosensitive detector for detecting light flashes resulting from collapses of neutron-caused vapor pockets in the detector liquid,
    wherein light flash detections correspond to neutron counts.

12. A portable neutron detection system, comprising:
    detector liquid,
    an enclosure,
      wherein the enclosure includes walls,
      wherein the enclosure comprises a substantially vertical axis,
      wherein the enclosure contains the detector liquid,
      wherein the enclosure includes arms inclined relative to the vertical axis, wherein the enclosure includes a venturi valve region,
    wherein the venturi valve region includes a substantially vertical venturi tube,
    wherein the venturi tube includes contraction and expansion regions,
wherein the enclosure includes a fluid reservoir,
    wherein the reservoir is located below the venturi valve region,
    wherein the reservoir is in fluid communication with the arms and the venturi valve region,
    wherein the reservoir is positioned to receive detector liquid passed through the arms,
a spinning mechanism,
    wherein the spinning mechanism is affixed to the enclosure,
    wherein the spinning mechanism is operable to spin the arms and the venturi tube to create negative pressure in the detector liquid,
    wherein spinning of the arms creates a centrifugal force that causes continuous recirculation of the detector liquid through the enclosure,
a detection mechanism,
    wherein the centrifugal force pumps detector liquid from the reservoir through the venture tube,
    wherein flow of detector liquid through the venturi tube creates negative pressure in the detector liquid,
    wherein neutron interaction with negative pressure detector liquid in the venturi valve region creates a cavitation vapor pocket in the detector liquid,
    wherein the detection mechanism comprises an acoustic wave monitor including an acoustic microphone,
    wherein the detection mechanism is operable to detect an audible shock wave resulting from collapse of the vapor pocket in the venturi valve region,
    wherein intensity of the shock wave is associated with a particular type of nuclear particle,
wherein the neutron detection system is operable to provide continuous detection of neutrons.

13. The portable neutron detection system of claim 12, wherein the intensity of the shock wave is associated with a particular type of nuclear particle and the neutron detection system is operable to provide continuous detection of neutrons based on intensity of shock waves in the detector liquid.

\* \* \* \* \*